(12) United States Patent
Jarman (10) Patent No.: US 11,615,818 B2
(45) Date of Patent: *Mar. 28, 2023

(54) APPARATUS, SYSTEM AND METHOD FOR ASSOCIATING ONE OR MORE FILTER FILES WITH A PARTICULAR MULTIMEDIA PRESENTATION

(71) Applicant: ClearPlay, Inc., Salt Lake City, UT (US)

(72) Inventor: Matthew T. Jarman, Salt Lake City, UT (US)

(73) Assignee: ClearPlay, Inc., Salt Lake City, UT (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/235,667

(22) Filed: Apr. 20, 2021

(65) Prior Publication Data

US 2021/0350832 A1 Nov. 11, 2021

Related U.S. Application Data

(63) Continuation of application No. 16/423,828, filed on May 28, 2019, now Pat. No. 10,984,835, which is a (Continued)

(51) Int. Cl.
*H04N 5/84* (2006.01)
*G11B 27/10* (2006.01)
(Continued)

(52) U.S. Cl.
CPC .......... *G11B 27/105* (2013.01); *G11B 27/322* (2013.01); *G11B 2220/2562* (2013.01)

(58) Field of Classification Search
USPC .................................................. 386/248, 332
See application file for complete search history.

(56) References Cited

U.S. PATENT DOCUMENTS

| | | | |
|---|---|---|---|
| 3,973,202 A | 8/1976 | Gardner | |
| 4,782,402 A | 11/1988 | Kanamaru | |

(Continued)

FOREIGN PATENT DOCUMENTS

| | | |
|---|---|---|
| JP | H05198135 A | 8/1993 |
| TW | 201008148 A | 2/2010 |

(Continued)

OTHER PUBLICATIONS

Author Unknown, "RCA DVD Player User's Manual RC5227P," Thomson Consumer Electronics, 2000, 111 Pages.
(Continued)

*Primary Examiner* — Nigar Chowdhury (74) *Attorney, Agent, or Firm* — Polsinelli PC; Derek D. Donahoe (57) ABSTRACT

A method, apparatus, computer program product and computer accessible code configured to link or otherwise associate content filters with a multimedia presentation, e.g., a movie. The content filter data includes an identifier value with an aspect ratio identifier or as a function of an aspect ratio for a particular multimedia presentation associated with the filter information. In one implementation, association between a filter set and a multimedia presentation involves a filtering application that searches a particular multimedia presentation to locate aspect ratio information and further searches filter information for a matching aspect ratio identifier.

24 Claims, 1 Drawing Sheet

Related U.S. Application Data continuation of application No. 14/513,095, filed on Oct. 13, 2014, now Pat. No. 10,304,494, which is a continuation of application No. 12/761,293, filed on Apr. 15, 2010, now Pat. No. 8,861,939, which is a continuation of application No. 11/379,180, filed on Apr. 18, 2006, now abandoned.

(60) Provisional application No. 60/672,914, filed on Apr. 18, 2005.

(51) Int. Cl.
*G11B 27/32* (2006.01)
*H04N 5/89* (2006.01)

(56) References Cited

U.S. PATENT DOCUMENTS

| | | |
|---|---|---|
| 4,830,160 A | 5/1989 | Marshall |
| 5,161,034 A | 11/1992 | Klappert |
| 5,345,594 A | 9/1994 | Tsuda |
| 5,371,551 A | 12/1994 | Logan et al. |
| 5,418,853 A | 5/1995 | Kanota et al. |
| 5,550,575 A | 8/1996 | West et al. |
| 5,563,804 A | 10/1996 | Mortensen et al. |
| 5,642,477 A | 6/1997 | De et al. |
| 5,682,326 A | 10/1997 | Klingler et al. |
| 5,692,093 A | 11/1997 | Iggulden et al. |
| 5,715,400 A | 2/1998 | Reimer et al. |
| 5,737,479 A | 4/1998 | Fujinami |
| 5,784,528 A | 7/1998 | Yamane et al. |
| 5,870,523 A | 2/1999 | Kikuchi et al. |
| 5,931,908 A | 8/1999 | Gerba et al. |
| 5,951,639 A | 9/1999 | Macinnis |
| 6,011,894 A | 1/2000 | Nakamura et al. |
| 6,016,316 A | 1/2000 | Moura et al. |
| 6,100,941 A | 8/2000 | Dimitrova et al. |
| 6,233,389 B1 | 5/2001 | Barton et al. |
| 6,240,555 B1 | 5/2001 | Shoff et al. |
| 6,263,305 B1 | 7/2001 | Yamaga |
| 6,317,795 B1 | 11/2001 | Malkin et al. |
| 6,332,147 B1 | 12/2001 | Moran et al. |
| 6,337,947 B1 | 1/2002 | Porter et al. |
| 6,363,505 B1 | 3/2002 | Vest et al. |
| 6,369,216 B1 | 4/2002 | Patchen et al. |
| 6,370,316 B1 | 4/2002 | Yamada et al. |
| 6,408,128 B1 | 6/2002 | Abecassis |
| 6,429,879 B1 | 8/2002 | Sturgeon et al. |
| 6,460,082 B1 | 10/2002 | Lumelsky et al. |
| 6,493,005 B1 | 12/2002 | Wu |
| 6,502,137 B1 | 12/2002 | Peterson et al. |
| 6,505,153 B1 | 1/2003 | Van et al. |
| 6,600,869 B1 | 7/2003 | Chen et al. |
| 6,615,266 B1 | 9/2003 | Hoffman, Jr. et al. |
| 6,633,673 B1 | 10/2003 | Shen |
| 6,633,855 B1 | 10/2003 | Auvenshine |
| 6,662,060 B1 | 12/2003 | Maliszewski et al. |
| 6,684,240 B1 | 1/2004 | Goddard |
| 6,829,781 B1 | 12/2004 | Bhagavath et al. |
| 6,922,843 B1 | 7/2005 | Herrington et al. |
| 6,961,704 B1 | 11/2005 | Phillips et al. |
| 6,973,461 B1 | 12/2005 | Fleming, III et al. |
| 7,054,547 B1 | 5/2006 | Abecassis |
| 7,185,355 B1 | 2/2007 | Ellis et al. |
| 7,269,838 B1 | 9/2007 | Boyer et al. |
| 7,272,298 B1 | 9/2007 | Lang et al. |
| 7,360,234 B2 | 4/2008 | Robson et al. |
| 7,364,232 B2 | 4/2008 | Mees et al. |
| 7,380,258 B2 | 5/2008 | Durden et al. |
| 7,426,470 B2 | 9/2008 | Chu et al. |
| 7,430,360 B2 | 9/2008 | Abecassis |
| 7,434,245 B1 | 10/2008 | Shiga et al. |
| 7,457,312 B2 * | 11/2008 | Weiss ............... H04L 47/722 370/473 |
| 7,480,613 B2 | 1/2009 | Kellner |
| 7,526,784 B2 | 4/2009 | Jarman |
| 7,543,318 B2 | 6/2009 | Jarman |
| 7,577,970 B2 | 8/2009 | Jarman |
| 8,027,568 B1 | 9/2011 | Abecassis |
| 8,117,282 B2 | 2/2012 | Jarman |
| 9,628,852 B2 | 4/2017 | Jarman |
| 2001/0020944 A1 | 9/2001 | Brown et al. |
| 2002/0002562 A1 | 1/2002 | Moran et al. |
| 2002/0010916 A1 | 1/2002 | Thong et al. |
| 2002/0023103 A1 | 2/2002 | Gagne |
| 2002/0055950 A1 | 5/2002 | Witteman |
| 2002/0069218 A1 * | 6/2002 | Sull ............... G11B 27/105 715/201 |
| 2002/0091662 A1 | 7/2002 | Bogia |
| 2002/0146239 A1 | 10/2002 | Hamasaka et al. |
| 2002/0147782 A1 | 10/2002 | Dimitrova et al. |
| 2002/0154156 A1 | 10/2002 | Moriwake et al. |
| 2002/0156001 A1 * | 10/2002 | Econs ............... A61K 38/1825 435/325 |
| 2002/0163532 A1 | 11/2002 | Thomas et al. |
| 2003/0088778 A1 | 5/2003 | Lindqvist et al. |
| 2003/0103627 A1 | 6/2003 | Nierzwick et al. |
| 2003/0192044 A1 | 10/2003 | Huntsman |
| 2003/0234812 A1 | 12/2003 | Drucker et al. |
| 2003/0236716 A1 * | 12/2003 | Manico ............... H04N 1/00132 |
| 2004/0006767 A1 | 1/2004 | Robson et al. |
| 2004/0073428 A1 | 4/2004 | Zlokarnik et al. |
| 2004/0096200 A1 | 5/2004 | Chen et al. |
| 2004/0128686 A1 | 7/2004 | Boyer et al. |
| 2004/0152054 A1 | 8/2004 | Gleissner et al. |
| 2004/0267940 A1 | 12/2004 | Dideriksen et al. |
| 2005/0010952 A1 | 1/2005 | Gleissner et al. |
| 2005/0028191 A1 | 2/2005 | Sullivan et al. |
| 2005/0028208 A1 | 2/2005 | Ellis et al. |
| 2005/0086069 A1 | 4/2005 | Watson et al. |
| 2005/0174975 A1 * | 8/2005 | Mgrdechian ........ H04L 67/306 370/338 |
| 2005/0193446 A1 * | 9/2005 | Zou ............... C12N 9/1029 435/468 |
| 2005/0233335 A1 * | 10/2005 | Wittwer ............... C09B 23/04 544/333 |
| 2005/0249285 A1 * | 11/2005 | Chen ............... H04N 19/132 375/E7.254 |
| 2005/0251827 A1 | 11/2005 | Ellis et al. |
| 2006/0045280 A1 * | 3/2006 | Boss ............... G05B 15/02 381/58 |
| 2006/0218575 A1 | 9/2006 | Blair |
| 2008/0276278 A1 | 11/2008 | Krieger et al. |
| 2009/0204404 A1 | 8/2009 | Jarman et al. |
| 2009/0249176 A1 | 10/2009 | Jarman |
| 2010/0195990 A1 | 8/2010 | Jarman |
| 2010/0293568 A1 | 11/2010 | Jarman |
| 2012/0005034 A1 | 1/2012 | Jarman et al. |
| 2012/0207446 A1 | 8/2012 | Jarman et al. |
| 2015/0043894 A1 | 2/2015 | Jarman et al. |

FOREIGN PATENT DOCUMENTS

| | | |
|---|---|---|
| WO | 9308568 A1 | 4/1993 |
| WO | 0016336 A1 | 3/2000 |
| WO | 0108148 A1 | 2/2001 |
| WO | 0235840 A1 | 5/2002 |
| WO | 0237853 A1 | 5/2002 |
| WO | 2005020034 A2 | 3/2005 |

OTHER PUBLICATIONS

Brinkley J., "Home Box Office Will Offer High-Definition TV Programming Next Year," The New York Times, Jun. 11, 1997, Section D, 3 Pages.

International Search Report for International Application No. PCT/US05/12448, dated Mar. 27, 2006, 6 Pages.

Jayson B., "400 Channels and (Click); Digital Television Changes City's Cable Landscape," The New York Times, Dec. 28, 2000, Section B, 4 Pages.

Mifflin L., "As Band of Channels Grows, Niche Programs Will Boom," The New York Times, Dec. 28, 1998, Section A, 5 Pages.

(56) References Cited

OTHER PUBLICATIONS

Paek S., et al., "Self-Describing Schemes for Interoperable MPEG-7 Multimedia Content Descriptions," Department of Electrical Engineering, Columbia University, Jan. 1999, 13 Pages.

Yao A., et al., "The Development of A Video Metadata Authoring and Browsing System in XML," School of Computer Science & Engineering, The University of New South Wales, 2000, 8 Pages.

\* cited by examiner

APPARATUS, SYSTEM AND METHOD FOR ASSOCIATING ONE OR MORE FILTER FILES WITH A PARTICULAR MULTIMEDIA PRESENTATION

CROSS-REFERENCE TO RELATED APPLICATIONS

The present application is a continuation application claiming priority to U.S. Nonprovisional application Ser. No. 16/423,828 filed May 28, 2019, which is a continuation of U.S. Nonprovisional application Ser. No. 14/513,095 filed Oct. 13, 2014, which is a continuation of granted U.S. Nonprovisional application Ser. No. 12/761,293 filed Apr. 15, 2010, now U.S. Pat. No. 8,861,939, which is a continuation of Nonprovisional application Ser. No. 11/379,180 filed Apr. 18, 2006, which claims the benefit of expired U.S. Provisional Application No. 60/672,914 titled "Apparatus, System, and Method for Associating One or More Filter Files with a Particular Multimedia Presentation," filed Apr. 18, 2005, all of which are hereby incorporated by reference herein.

The present application is related to U.S. provisional application No. 60/763,525 titled "Filtering a Multimedia Presentation in a Video-on-Demand Environment," filed Jan. 30, 2006, U.S. provisional application No. 60/785,547 titled "Synchronizing Filter Meta-Data With a Multimedia Presentation," filed Mar. 24, 2006, U.S. non-provisional application Ser. No. 11/104,924 titled "Apparatus, System, and Method for Filtering Objectionable Portions of a Multimedia Presentation," filed Apr. 12, 2005, U.S. non-provisional application Ser. No. 11/256,419 titled "Method and User Interface for Downloading Audio and Video Content Filters to a Media Player," filed Oct. 20, 2005, U.S. patent application Ser. No. 11/327,103 titled "Media Player Configured to Receive Playback Filters from Alternative Storage Mediums," filed Jan. 5, 2006, U.S. provisional application 60/620,902 titled "Method and User Interface for Downloading Audio and Video Content Filters to a Media Player" filed Oct. 20, 2004, U.S. provisional patent application No. 60/641,678 titled "Video Player Configured to Receive Playback Filters from Alternative Storage Medium" filed Jan. 5, 2005, U.S. application Ser. No. 09/694,873 titled "Multimedia Content Navigation and Playback," filed Oct. 23, 2000, now U.S. Pat. No. 6,898,799, issued May 24, 2005, and U.S. application Ser. No. 09/695,102 titled "Delivery of Navigation Data for Playback of Audio and Video Content," filed Oct. 23, 2000, now U.S. Pat. No. 6,889,383, issued May 3, 2005, the disclosure of each of the above-recited applications are hereby incorporated by reference herein. Appendix A, including 2 pages of program code, is included with the present non-provisional application and is hereby incorporated by reference herein.

FIELD OF THE INVENTION

Aspects of the present invention involve a system, method, and apparatus for associating a filter file or set of filter files with a particular multimedia presentation.

BACKGROUND

A multimedia presentation, such as audio provided on CD and a movie provided on DVD, may contain certain language, images, scenes, or other content, not suitable or considered objectionable by certain audiences. To address this concern, certain technologies have been developed to allow filtering, such as skipping or muting, various types of content. This technology allows, for example, the viewing of a movie originally containing more adult-oriented content by younger, less mature viewers. Generally, the filtering function is provided by a media content "filter" resident within the DVD player that specifically applies to a particular multimedia presentation. The filter, which is typically stored within a nonvolatile logic memory of the media player, such as flash memory, indicates which portions of the multimedia presentation are to be skipped, or which audio portions are to be muted, by the DVD player during playback. Typically, whether the filter is employed for a particular presentation of the multimedia may be determined by the user by way of a menu selection system provided by the media player. Further, different forms of objectionable content, such as profane language, sexually explicit content, and so on, may also be selectively filtered by way of the menu system. In some systems, the filtering system may be protected by way of a user-defined password so that those not privy to the password are unable to defeat the filtering mechanism.

Each filter specific to a particular presentation is typically produced at some point after a multimedia presentation has been released. Thus, for example, while some filters for preexisting movies may be pre-installed in the DVD player, the player normally also includes a method of accepting and storing new filters as they are produced. Typically, filters are installed by way of a CD, DVD, or other disc readable by the same memory reader of the DVD player that also reads the DVD or other storage medium having the multimedia presentation. Therefore, a user inserts the disc containing the filters of interest into the tray or slot normally employed for playback. The DVD player, recognizing the disc as one containing filters, installs the filters from the disc, possibly at the guidance of the user by way of the player menu system.

Besides use of multimedia title information and other multimedia presentation attributes, what is needed is a way to accurately associate a particular multimedia's filter set with the multimedia presentation, which may be in conjunction with employment of other attributes.

SUMMARY

One aspect of the present invention involves a computer program product comprising a computer useable medium and computer readable code embodied on the computer useable medium for identifying a multimedia presentation with an associated aspect ratio, the computer readable code comprising one or more filter files associated with the multimedia presentation, the filter files each identifying a portion of the multimedia presentation, each filter file further identifying a filtering action for the portion of the multimedia presentation. The computer readable code further involves at least one data value configured to identify the aspect ratio of the multimedia presentation.

Another aspect of the present invention involves a computer program product comprising a computer useable medium and computer readable code embodied on the computer useable medium for identifying a multimedia presentation with an associated aspect ratio, the computer readable code comprising one or more filter files associated with the multimedia presentation, the filter files each identifying a portion of the multimedia presentation, each filter file further identifying a filtering action for the portion of the multimedia presentation. The computer readable code further comprising at least one data value configured as a function of at least the aspect ratio of the multimedia presentation.

Another aspect of the present invention involves a method for associating a multimedia presentation with content filter information, the method comprising: obtaining content filtering data corresponding with a particular multimedia presentation, the content filtering data including at least one multimedia identifier, the multimedia identifier including at least one data value corresponding to an aspect ratio for the multimedia presentation. The method further involves analyzing a multimedia presentation to determine an aspect ratio for the multimedia presentation and comparing the aspect ratio for the multimedia presentation to the at least one multimedia identifier. Finally, the method involves applying the content filtering data to the multimedia presentation as function of the operation of comparing.

DETAILED DESCRIPTION OF EMBODIMENTS OF THE INVENTION

Aspects of the present invention involve a system, method, and apparatus for associating a filter file or set of filter files with a particular multimedia presentation based at least in part on aspect ratio information. Each multimedia presentation includes an identification of the aspect ratio or other video attribute, such as full screen or wide screen, for the multimedia presentation. Any filter file (or files) developed for the multimedia presentation includes coding with an identifier of the aspect ratio for the multimedia presentation. The term "filter file" or filter as used herein is meant to refer to an indicia of a portion of a multimedia presentation and an associated filtering action. The filtering action may involve some form of contact suppression, whether skipping, blurring, cropping, and/or muting portions of the multimedia presentation. The portion of the multimedia presentation subject to suppression may be identified by a start and end time code, by a time or location and offset value, and through other multimedia relative identification means that provide for accurate identification of some discrete portion of a multimedia presentation. One or more filter files for a particular multimedia presentation may be provided in a "filter table." A filter file or filter table configured for a particular multimedia presentation also includes an identification of the aspect ratio for the particular multimedia presentation. The aspect ratio identifier provides a way to associate a particular filter file or table with a particular multimedia presentation. Other characteristics, besides the aspect ratio, may also be used, alone or in conjunction with the aspect ratio, to associate a particular filter table with a particular multimedia presentation.

The filter file or table may be used along with a system, apparatus, and method for a user to play a multimedia presentation, such as a movie provided on a DVD, a movie provided by way of a video-on-demand service, and other media types, coding arrangements, and distribution platforms, with objectionable types of scenes and language filtered (a "filtering application"). The filtering application monitors the playback of a multimedia presentation in comparison with one or more filter files, and filters the playback as a function of the filter files. As referenced above, filtering may involve some form of content suppression, such as muting objectionable language in a multimedia presentation, skipping past objectionable portions of a multimedia presentation as a function of the time of the objectionable language or video, modifying the presentation of a video image such as through cropping, or fading, or otherwise modifying playback to eliminate, reduce, or modify the objectionable language, images, or other content. Filtering may further extend to other content that may be provided in a multimedia presentation, including close captioning text, data links, program guide information, etc.

The filtering application monitors playback of the multimedia presentation and compares playback with one or more filter files. In one particular implementation, the filtering application monitors time codes of the multimedia presentation being played. It is also possible to monitor other indicia of the multimedia data read from the DVD, such as indicia of the physical location on a memory media from which the data was read. In one particular implementation, filter file includes an indicia of portion of the multimedia presentation wherein the indicia comprises a start time code and end time code. For any given multimedia presentation, a plurality of filter files are typically provided in a filter table. When there is match between the time code of the multimedia presentation and start time code of the filter file, then the filtering application executes the specified filtering action. In one example, the specified filtering action includes a skip action or a mute action, which causes the playback (both audio and video) of the multimedia presentation to stop at the start time and resume at the end time or to mute the audio component between the start time and end time, respectively.

TABLE 1

Filter Types and Associated Description of Content of Scene for each Filter Type

| Filter Code | Filter Classification | Filter type | Filter Action |
|---|---|---|---|
| V-S-A | Violence | Strong Action Violence | Removes excessive violence, including fantasy violence |
| V-B-G | Violence | Brutal/Gory Violence | Removes brutal and graphic violence scenes |
| V-D-I | Violence | Disturbing Images | Removes gruesome and other disturbing images |
| S-S-C | Sex and Nudity | Sensual Content | Removes highly suggestive and provocative situations and dialogue |

TABLE 1-continued

Filter Types and Associated Description of Content of Scene for each Filter Type

| Filter Code | Filter Classification | Filter type | Filter Action |
|---|---|---|---|
| S-C-S | Sex and Nudity | Crude Sexual Content | Removes crude sexual language and gestures |
| S-N | Sex and Nudity | Nudity | Removes nudity, including partial and art nudity |
| S-E-S | Sex and Nudity | Explicit Sexual Situation | Removes explicit sexual dialogue, sound and actions |
| L-V-D | Language | Vain Reference to Deity | Removes vain or irreverent reference to Deity |
| L-C-L | Language | Crude Language and Humor | Removes crude sexual language and gestures |
| L-E-S | Language | Ethnic and Social Slurs | Removes ethnically or socially offensive results |
| L-C | Language | Cursing | Removes profane uses of "h*ll" and "d*mn" |
| L-S-P | Language | Strong Profanity | Removes swear words, including strong profanities |
| L-G-V | Language | Graphic Vulgarity | Removes graphic vulgarities, including "f***" |
| O-E-D | Other | Explicit Drug Use | Removes descriptive scenes of illegal drug use |

Table 1 provides a list of examples of filter types that may be provided individually or in combination in an embodiment conforming to the invention. The filter types are grouped into five broad classifications, including: Violence, Sex/Nudity, Language, and Other. Within each of the four broad classifications, are a listing of particular filter types associated with each broad classification. A particular filter file for a particular multimedia presentation includes an indicia of a portion of the multimedia presentation, which may be in the form of a time sequence between a start time and an end time, and an indicia of the subject matter falling within the specified time sequence. In one particular implementation, a filter application causes multimedia time sequences to be skipped or muted as a function of one or more user selected particular filter types, e.g., V-S-A. Alternatively, or additionally, multimedia time sequences may be skipped or muted as a function of a broad classification, e.g., V, in which case all portions of a multimedia presentation falling within a broad filter classification will be skipped or muted. Through the filtering application, a user may activate any combination of the particular filter types.

Further details concerning the filtering application and filter file formatting are described in co-pending non-provisional application Ser. No. 11/104,924 titled "Apparatus, System, and Method for Filtering Objectionable Portions of a Multimedia Presentation" filed on Apr. 12, 2005.

The filtering application may be accessible from a processor in a multimedia player, such as a DVD player. The filter application, in such an arrangement, may be stored in a memory directly accessible by the multimedia processor or internal player memory. The filter tables for various multimedia presentations, on the other hand, are initially stored remotely from the multimedia player. In one particular implementation, the filter table for a particular multimedia presentation is loaded into memory of the multimedia player so that the filtering application may access the filter table to perform filtered playback of the multimedia presentation. To associate a particular filter file or set of filter files (filter table) with a particular multimedia presentation, aspect ratio information for the particular multimedia presentation is associated with the particular filter file. Other information may also be used to associate the filter information with the particular multimedia information, such as multimedia title information, multimedia length information, etc.

In the context of a DVD-based multimedia presentation, aspect ratio information for the multimedia presentation may be found in a directory commonly referred to as a "Video TS directory." The Video-TS directory includes a map of all titles stored on the DVD. "Titles" referring to DVD titles as defined in the DVD specification, which refers to a hierarchy of information on the DVD. The map is typically found in a particular file referred to as a "VIDEO_TS.IFO" file. Amongst all of the titles on the DVD will be the title file for the particular multimedia presentation associated with the filter file. Typically, the feature presentation is title one of a DVD. Thus, the aspect ratio for title one is identified. If the main movie title is not the first title, then the aspect ratio may be identified manually and by other means.

The aspect ratio information for the title of interest, e.g., title 1, is found at position 0x200 (hex) of a file referred to as a "VTS ##0.1F0" file, where ## represents the number of the title. Aspect ratio information is provided in a two byte format, with bits 2 and 3 relating to the aspect ratio for the specified title. The combined value of bits 2 and 3 is converted to an integer value. The VIDEO_TS.IFO file also has aspect ratio information available at location 0x100. If the value of the integer equals zero (bit 2=0, bit 3=0) then the movie has an aspect ratio of 4:3 (full-screen). If the value of the integer is three (bit 2=1, bit 3=1), then the aspect ratio if 16:9 (widescreen). The code found in Appendix A, which is hereby incorporated by reference herein, illustrates one particular method for parsing a DVD in order to identify the aspect ratio for title one of the DVD. In this implementation, it is presumed that title one of the DVD includes the feature presentation (i.e., the title with the data for the movie title (e.g., "Gladiator") listed on the DVD) and for which a filter file may have been developed.

The aspect ratio information is provided in a computer readable media having the filter files of the particular multimedia presentation. The filter files (filter table) for a particular multimedia presentation may be provided on a removable memory media, such as CD, DVD, memory stick, etc. The filter files may also be transmitted or served from a remote memory location. In such an arrangement, it is possible for a user to access or purchase the filter files by way of a network location, such as a web site. Such a method is described in co-pending U.S. non-provisional application Ser. No. 11/256,419, filed Oct. 20, 2005 and entitled "Method and User Interface for Downloading Audio and Video Content Filters to a Media Player." Upon purchase or identification of a filter table, the filter table is transmitted to the client device. The filter table may be transmitted and stored to a removable memory media, such as DVD, CD, floppy disk, memory stick, etc. From the removable memory media the filter table may be loaded to a multimedia player memory for use by the filtering application or directly accessed from the removable memory. The client device may also be the target DVD player, in which case the filter table is directly uploaded to DVD player memory from the remote memory location. The filter files may also be loaded to a DVD player from other memory media, such as described in co-pending U.S. application Ser. No. 11/327,103, filed Jan. 5, 2006 and entitled "Media Player Configured to Receive Playback Filters from Alternative Storage Mediums" The filter files are meant to be uploaded to a multimedia player or otherwise accessed by a multimedia player (e.g., DVD player) having a filtering application configured to use the filter files in order to filter a multimedia presentation accessed by the multimedia player.

The aspect ratio information encoded on a memory media and associated with a filter file or table for a multimedia presentation may be identified in any number of ways. In one particular implementation, a bit or bits are set in a specified arrangement and location. For example, a bit may be set to a digital 0 to represent a full screen aspect ratio, and a digital 1 to represent a wide screen aspect ratio. In another example, two bits may be set to digital 0 (i.e., 00 . . . ) to represent a full screen aspect ratio or the same two bits set to a digital 1 (i.e., 11 . . . ) to represent a wide screen aspect ratio.

Figure 1:
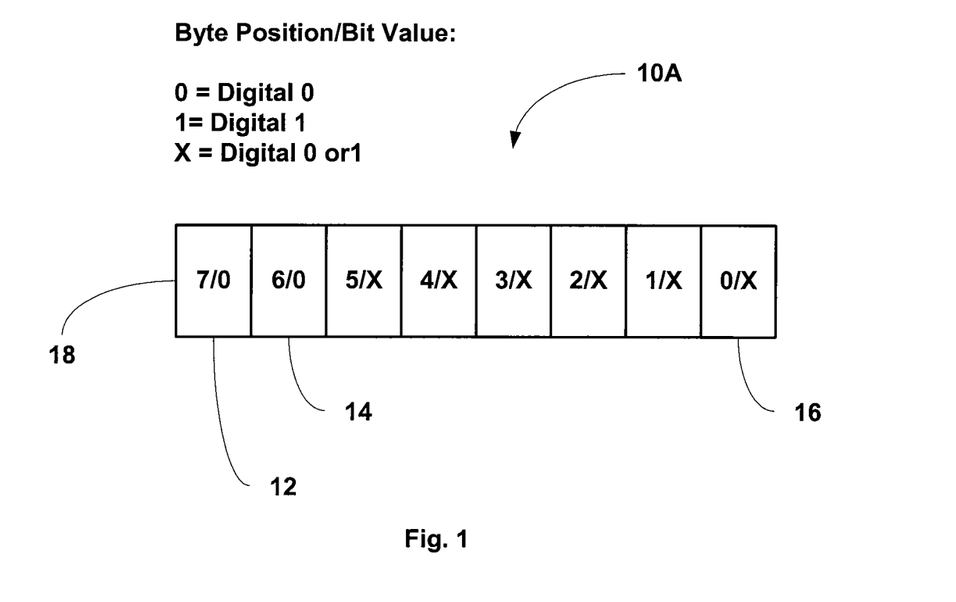
FIG. 1 is a diagram of the format of one byte of a filter file multimedia media identifier using a full screen aspect ratio identifier, conforming to aspects of the present invention.

FIG. 1 represents a byte arrangement 10A for one particular filter table (e.g., a set of discrete filters for a particular movie), with the byte arranged to connote a filter file or table associated with a multimedia presentation provided in a full screen format. In this example, two particular bits (12, 14) of an 8-bit byte value are each set to a digital 0 to identify a full screen multimedia presentation. As shown in FIG. 1, the bits may be included in a larger byte.

Figure 2:
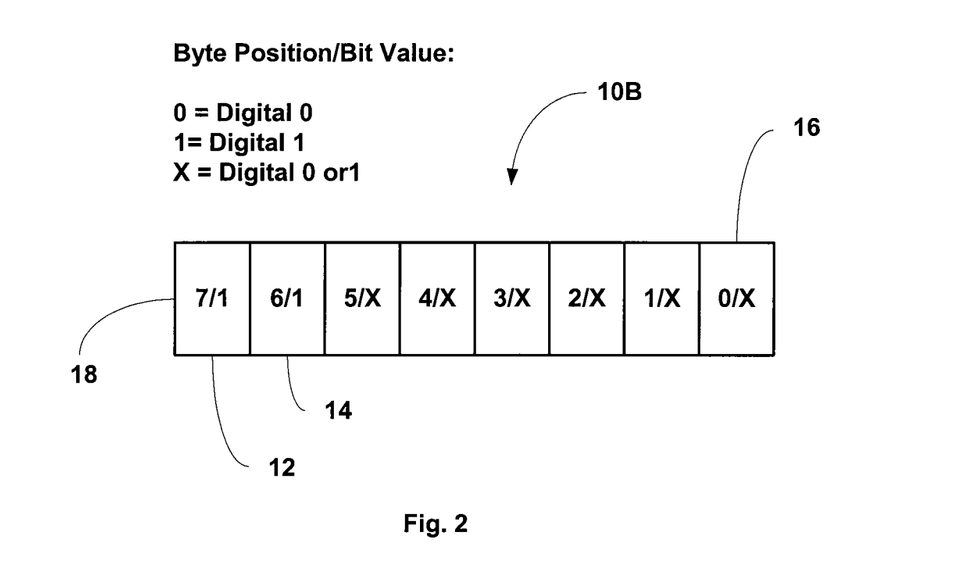
FIG. 2 is a diagram of the format of one byte of a filter file multimedia identifier using a wide screen aspect ratio identifier, conforming to aspects of the present invention.

Typically, an 8-bit byte identifies bits starting with bit 0 (16) in the right-most position and bit 7 (18) in the left-most position. In this example, bits 7 and 6 are each set to digital 0 to identify a full screen multimedia presentation. FIG. 2 illustrates a byte arrangement 10B for one particular filter set, with the byte arranged to connote a filter file or table associated with a multimedia presentation provided in a wide screen format. In FIG. 2, the same 8-bit byte of FIG. 1 has bits 7 and 6 set to digital 11 to identify a wide screen multimedia presentation. The same or different bytes may be used to identify different aspect ratio. Further, other bit combinations are possible to identify full screen and wide screen aspects ratios, as well as other possible video attributes of a particular multimedia presentation. It is also possible to simply set one bit as either 0 (full screen) or 1 (wide screen).

Other bits in the specified byte (i.e., bits 0-6 may be used for other purposes or serve as padding). The aspect ratio bit, bits, or byte may be included in a larger set of identifying data or may be provided separately therefrom. Moreover, it is also possible to set various bits or provide identifying values where aspect ratio information is used to generate the identifier in conjunction with other multimedia attributes, such as title information.

The filtering application, resident in a DVD player in one example, is configured to read the aspect ratio information for whatever multimedia presentation is placed in the DVD drive, such as through the code provided in Appendix A. The filtering application then compares the aspect ratio information for the multimedia presentation with the aspect ratio information for any filter table loaded in memory or otherwise accessible by the multimedia player configured to run the filtering application. The filtering application uses the aspect ratio information to determine if the appropriate filter file or files are loaded in memory. If there is not a match between a particular filter file or table and a particular multimedia presentation, then the filter file or table is not a match to the particular multimedia presentation. As mentioned above, the filtering application may use other information, as well, to determine if a particular filter table corresponds with a selected multimedia presentation.

Embodiments within the scope of the present invention also include computer-readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, DVD, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Embodiments within the scope of the present invention also include computer-readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, CD-ROM, DVD, or other optical disk storage, magnetic disk storage or other magnetic storage devices, or any other medium which can be used to carry or store desired program code means in the form of computer-executable instructions or data structures and which can be accessed by a general purpose or special purpose computer. Implementations of the present invention may be stored as computer readable instructions on a DVD along with a multimedia presentation intended to be filtered and played back with various time sequences muted or skipped. When information is transferred or provided over a network or another communications link or connection (either hardwired, wireless, or a combination of hardwired or wireless) to a computer (a computer data signal), the computer properly views the connection as a computer-readable medium.

Thus, any such a connection is properly termed a computer-readable medium. Combinations of the above should also be included within the scope of computer-readable media. Computer executable instructions comprise, for example, instructions and data which cause a DVD player, a general purpose computer, special purpose computer, or special purpose processing device to perform a certain function or group of functions.

Although not required, aspects of the invention may be deployed as computer-executable instructions, such as program modules, adapted for deploying a filter file that may be readable and usable by a filter application loaded on a DVD player. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps. Furthermore, program code means being executed by a processing unit provides one example of a processor means.

APPENDIX A

The following program code calls the function to get the aspect ratio for a feature presentation found in title 1 of a DVD and returns a value of the aspect ratio for the feature multimedia presentation found in title 1

```
            // Read title 1 and retrieve the video attributes flag
            short videoAttributes = ReadVideoAttributes(dvdDrive);
            // test bits 2 & 3
            videoAttributes = (short)((videoAttributes & 0x0C) >>
2);
        private static short ReadVideoAttributes(string dvdPath)
        {
            string ifoPath =
string.Format(@"{0}VIDEO_TS\VIDEO_TS.IFO", dvdPath);
            FileStream fileIfo;
            if (!File.Exists(ifoPath))
                return 0;
            fileIfo = new FileStream(ifoPath, FileMode.Open,
FileAccess.Read);
            // Find out which VTS is Title 1.
            fileIfo.Position = 0xC4; // Find VMG_PTT_SRPT
            int titleMapOffset = 0;
            byte[ ]buffer = new byte[25];
            byte vts = 0;
            // Find out the location of the title map
            fileIfo.Read(buffer, 0, 4);
            titleMapOffset =
ClearPlay.Convert.ReverseInt(System.BitConverter.ToInt32(buffer, 0));
            titleMapOffset *= 2048;
            // Read the title map, and get the VTS of title 1
            fileIfo.Position = titleMapOffset;
            fileIfo.Read(buffer, 0, 20);
            vts = buffer[0x0E];
            fileIfo.Close( );
            ifoPath =
string.Format(@"{0}VIDEO_TS\VTS_{1:D2}_0.IFO", dvdPath, vts);
            fileIfo = new FileStream(ifoPath, FileMode.Open,
FileAccess.Read);
            short videoAttributes = 0;
            // Read the video attributes
            fileIfo.Position = 0x200;
            fileIfo.Read(buffer, 0, 2);
            videoAttributes = System.BitConverter.ToInt16(buffer,
0);
            return videoAttributes;
        }
    }
```

I claim:

1. A computer program product comprising:
a non-transitory computer readable storage medium and computer readable code embodied on a non-transitory computer useable medium, the computer readable code comprising:
one or more filter actions associated with a compressed multimedia presentation, the filter action associated with at least one portion of the multimedia presentation, at least one portion of the multimedia presentation associated with at least one filter action decompressed and then compressed such that compressed portions of the multimedia presentation not associated with the at least one filter action can be decompressed independently from the at least one portion associated with the filter action, the filter action including at least one of a skipping, blurring, and muting action for the associated at least one portion of the multimedia presentation, the filter action associated with an indicia of a subject matter type of the at least one portion of the multimedia presentation; and
the one or more filter files actions each associated with a unique identifier by which the multimedia presentation may be identified, the unique identifier distinguishing the multimedia presentation so that a filter action for a different multimedia presentation is not selected to apply to the multimedia presentation, the one or more filter actions to be applied to the multimedia presentation by including the portions not identified by the filter action and excluding the portions identified by the one or more filter actions based on an indicia of a viewer preference for the subject matter type when the at least one unique identifier corresponds with the multimedia presentation.

2. The computer program product of claim 1 wherein the computer readable medium comprises a DVD.

3. The computer program product of claim 1 wherein the multimedia presentation comprises a movie.

4. The computer program product of claim 1 wherein the one or more filter files are associated with at least one portion of the multimedia presentation with two time codes indicators or with time code indicators and corresponding offset values.

5. The computer program product of claim 1 wherein the one or more filter files are associated with at least one portion of the multimedia presentation with a start time code and an end time code.

6. The computer program product of claim 1 wherein the indicia of the subject matter type of the at least one portion of the multimedia presentation indicates offensive subject matter.

7. The computer program product of claim 1 wherein the indicia of the subject matter type of the at least one portion of the multimedia presentation indicates subject matter of at least one of profanity, violence, or nudity.

8. The computer program product of claim 1 wherein at least one of the portions of the multimedia content not identified by the filtering action is encoded such that during a decoding process all audio and/or visual information associated with the portions is rendered during playback.

9. The computer program product of claim 1 wherein at least one of the portions of the multimedia content not identified by the filtering action and that follows a portion that is identified by the filtering action is encoded such that an initially displayed frame associated with the at least one portion does not rely on visual display information provided by a previous frame in a prior portion of the multimedia presentation.

10. A system comprising:
  at least one processor configured to identify at least one data value associated with a multimedia presentation to provide a unique identifier for linking filter actions specific to the multimedia presentation, the unique identifier distinguishing the multimedia presentation from other multimedia presentations so that an incorrect filter action is not selected for the multimedia presentation:
  the at least one processor further configured to, for a selected compressed multimedia presentation associated with the unique identifier, select one or more filter actions associated with the unique identifier, at least one portion of the multimedia presentation associated with at least one filter action decompressed and then compressed such that compressed portions of the multimedia presentation not associated with the one or more filter actions can be decompressed independently from the portions associated with the one or more filter actions, the filtering action including skipping, blurring, cropping and/or muting portions of the multimedia presentation, at least one filter action associated with an indicia of a subject matter type of the portion of the selected multimedia presentation; and
  the one or more filter actions to be applied to the multimedia presentation by including the portions not identified by the one or more filter actions and excluding the portions identified by the one or more filter actions based at least on an indicia of a viewer preference for the subject matter type.

11. The system of claim 10 wherein the computer useable medium comprises an optical disc.

12. The system of claim 10 wherein the multimedia presentation comprises a movie.

13. The system of claim 10 wherein the one or more filter files are associated with at least one portion of the multimedia presentation with two time codes indicators or with time code indicators and corresponding offset values.

14. The system of claim 10 wherein the one or more filter files are associated with at least one portion of the multimedia presentation with a start time code and an end time code.

15. The system of claim 10 wherein at least one of the portions of the multimedia content not identified by the filtering action is encoded such that during a decoding process all audio and/or visual information associated with the portions is rendered during playback.

16. The system of claim 10 wherein at least one of the portions of the multimedia content not identified by the filtering action and that follows a portion that is identified by the filtering action is encoded such that an initially displayed frame associated with the at least one portion does not rely on visual display information provided by a previous frame in a prior portion of the multimedia presentation.

17. A method for associating a multimedia presentation with content filter information comprising:
  identifying at least one data value associated with a multimedia presentation to uniquely identify content filtering data specific to the multimedia presentation and to distinguish the multimedia presentation from other multimedia presentations with content filtering data;
  for a particular compressed multimedia presentation with at least one data value uniquely identifying the multimedia presentation, accessing the content filtering data corresponding with the particular multimedia presentation, at least one portion of the multimedia presentation associated with content filtering data decompressed and then compressed such that compressed portions of the multimedia presentation not associated with the content filtering data can be decompressed independently from the portions associated with the content filtering data, the content filtering data associated with a filtering action for the portion of the multimedia presentation, the filtering action associated with at least one of skipping and muting the portion of the multimedia presentation, the content filtering data associated with at least one multimedia identifier and associated with an indicia of a subject matter type of the portion of the multimedia presentation applying the content uniquely identified filtering data to the multimedia presentation; and
  executing the filtering action based at least on an indicia of a viewer preference for the subject matter type, wherein applying the content filtering data enables the at least one of skipping and muting the portion of the multimedia presentation by including portions not identified by the content filtering data and excluding the portions identified by the content filtering data.

18. A multimedia player including a processor configured to perform the operations of claim 17.

19. The method of claim 17 wherein the one or more filter files are associated with at least one portion of the multimedia presentation with two time codes indicators or with time code indicators and corresponding offset values.

20. The method of claim 17 wherein the one or more filter files are associated with at least one portion of the multimedia presentation with a start time code and an end time code.

21. The method of claim 17 wherein the indicia of the subject matter type of the at least one portion of the multimedia presentation indicates subject matter at least one of profanity, violence, or nudity.

22. The method of claim 17 wherein at least one of the portions of the multimedia content not identified by the filtering action is encoded such that during a decoding process all audio and/or visual information associated with the portions is rendered during playback.

23. The method of claim 17 wherein at least one of the portions of the multimedia content not identified by the filtering action and that follows a portion that is identified by the filtering action is encoded such that an initially displayed frame associated with the at least one portion does not rely on visual display information provided by a previous frame in a prior portion of the multimedia presentation.

24. A computer program product comprising:
  a non-transitory computer readable storage medium and computer readable code embodied on a computer useable medium, the computer readable code comprising:
  one or more filter files associated with a compressed multimedia presentation, the filter files each associated with a portion of the multimedia presentation, each filter file further identifying a filtering action for the portion of the multimedia presentation, the filter action including at least one of a skipping, blurring, and muting action for the associated at least one portion of the multimedia presentation, the filter action associated with an indicia of a subject matter type of the at least one portion of the multimedia presentation; and
  the multimedia presentation compressed such that portions of the multimedia presentation not associated with at least one filter action can be decompressed independently from the at least one portion associated with the filter action; and the one or more filter actions each associated with a unique identifier by which the multimedia presentation may be identified, the unique identifier distinguishing the multimedia presentation so that a filter action for a different multimedia presentation is not selected to apply to the multimedia presentation, the one or more filter actions to be applied to the multimedia presentation by including the portions not identified by the filter action and excluding the portions identified by the one or more filter actions based on an indicia of a viewer preference for the subject matter type when the at least one unique identifier corresponds with the multimedia presentation.

* * * * *